April 3, 1956 K. M. WARNER 2,740,608
FISHING REEL
Filed Sept. 1, 1953 3 Sheets-Sheet 1
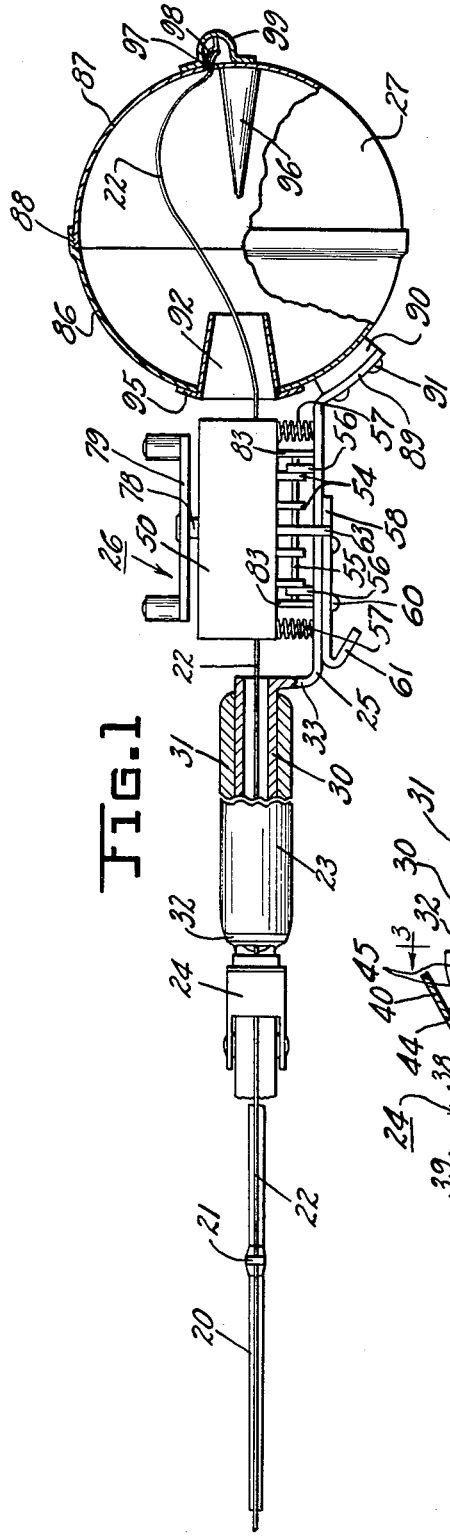
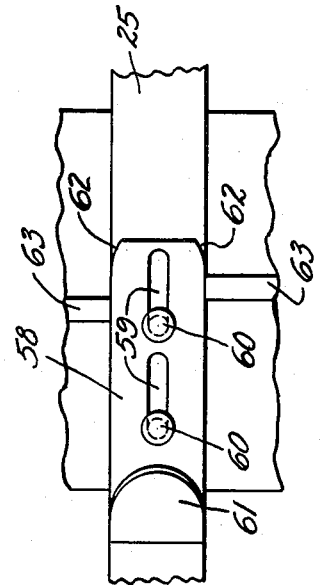
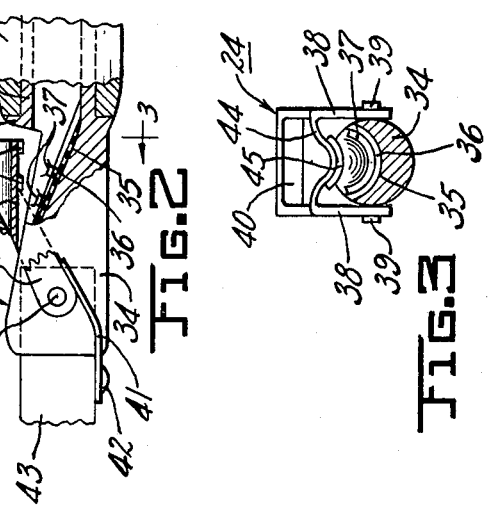
KENNETH M. WARNER.
INVENTOR.
BY Eugene C. Knoblock
ATTORNEY.

April 3, 1956 K. M. WARNER 2,740,608
FISHING REEL

Filed Sept. 1, 1953 3 Sheets-Sheet 2

INVENTOR.
KENNETH M. WARNER.
BY Eugene C. Knoblock
ATTORNEY.

KENNETH M. WARNER
INVENTOR.

BY Eugene C. Knoblock
ATTORNEY.

United States Patent Office 2,740,608
Patented Apr. 3, 1956

2,740,608

FISHING REEL

Kenneth M. Warner, South Bend, Ind.

Application September 1, 1953, Serial No. 377,891

10 Claims. (Cl. 254—175.5)

This invention relates to improvements in fishing reels, and particularly to a fishing reel usable with a stiff fishing line of the plastic monofilament type.

The primary object of the invention is to provide a fishing reel unit associated with a spherical container and provided with means for advancing a line into the container in a retracting or retrieving direction with respect to the fishing rod upon which the reel is mounted.

A further object is to provide a fishing reel comprising a two-part housing in which the parts mount cooperating endless friction members adapted to grip a line therebetween and to advance the line in a retrieving direction upon manipulation thereof, said housing parts being separable to disengage the line and permit free passage of line in a casting or out-feeding direction.

A further object is to provide a device of this character consisting of two parts hingedly connected upon a support and spring-urged to a selected position, and provided with means for locking the parts in operative line-engaging position to pull endwise upon the line upon manipulation thereof.

A further object is to provide a fishing reel having a pair of cooperating juxtaposed endless friction members having elongated abutting runs, wherein said endless members have resilient faces adapted to grip a line therebetween to be advanced upon movement of the endless members.

A further object is to provide a fishing unit, consisting of a rod, a spherical line-receiving container, a line-retrieving means releasably engaging the line and operable to feed the line into the spherical container, and a finger-pressed friction line-engaging member carried by the rod and adapted to grip the line or retard the advance thereof.

A further object is to provide a fishing unit having a releasable line-retrieving means and a spherical container into which the line is fed by the line-retrieving means, said line container having a mouth of non-circular shape and having an inwardly projecting pin diametrically opposed to said mouth, said pin and said mouth cooperating to feed a line into said container in substantially uniform and spherical arrangement without kinking thereof.

Other objects will be apparent from the following specification.

In the drawings:

Fig. 1 is a top view of a fishing rod and reel assembly employing my new reel, wherein some parts are shown in section;

Fig. 2 is a fragmentary enlarged detail view of a line-pressing member associated with the fishing rod, with parts thereof shown in section;

Fig. 3 is a transverse sectional view taken on line 3—3 of Fig. 2;

Fig. 8 is a fragmentary view of the back of the reel as viewed in the direction of the arrow in Fig. 4;

Figure 6:
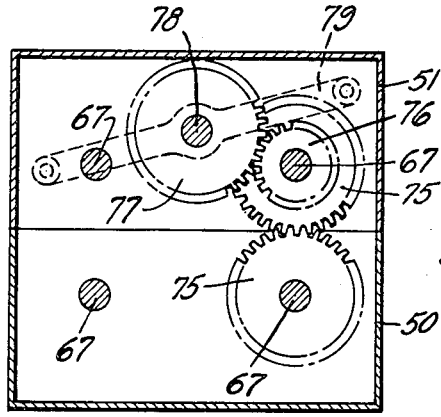
Fig. 6 is a sectional view of the reel in closed position taken in the plane designated by line 6—6 of Fig. 4 and rotated 90 degrees counterclockwise from the position of Fig. 4.

My new fishing reel is used as a part of a novel fishing tackle unit or rod and reel assembly whose principal parts are illustrated in Fig. 1 and consist of a rod unit or blade member 20 having a plurality of line guides 21 located at spaced points along its length in the manner well known in the art to serve as means for guiding the endwise movement of a fishing line 22 along said rod in both casting and retrieving direction. The rod may be formed of any suitable material, such as laminated bamboo, hollow or solid metal, fiberglass, reinforced plastic or the like. The rod includes a handle portion 23 mounted at its rear end with which is associated a thumb pressure locking member 24. A reel seat or base 25 is offset from the handle 23 and serves to mount the reel unit 26, and also a line container or receiver 27. The device is particularly well suited and is intended for use with a line 22 formed of plastic material or synthetic resin and preferably of the type known as monofilament which possesses the properties of strength, resilience and shape retention, and is conventionally used for fishing leaders.

The construction of the handle 23 and the thumb-pressed line-gripping unit 24 is best seen in Figs. 1, 2 and 3. The handle unit preferably has a tubular metal portion 30 open at its ends and encircled by a hand grip coating 31 formed of cork or any other suitable material. A flange 32 is formed at one end of the tube 30 and an offset portion 33 is formed at the other end of the tube, and the handle covering 31 is confined between the parts 32 and 33. A fitting portion 34 projects endwise from the tube 30 and the flange 32 thereof and is provided with a longitudinal groove inclined relative to the axis of the tube 30 and communicating with the interior of the tube 30. This groove 35 is preferably partially lined with rubber, synthetic rubber or other resilient material 36 which may have a plurality of spaced ribs 37 projecting therefrom and extending transversely thereof intermediate the length of the inclined groove 35. A finger piece is pivoted to the fitting 34 and preferably includes a pair of spaced arms 38 pivoted at 39 at their ends to the forward portion of the fitting 34. The arms 38 are interconnected by a cross member or finger-engaging plate 40 at their opposite ends. A spring 41 secured at 42 to a rod ferrule portion 43 may underlie one or both of the arms 38 to normally urge the spring finger-pressure member to the position illustrated in Figs. 2 and 3. A transversely curved plate 44 is carried by and extends between the arms 38 and at an angle to the plate 40, with its convex curvature substantially conforming to the concave curvature of the liner member 36 of the groove 35. One or more transverse ribs 45 may be carried by the plate 44 and will preferably be formed of rubber or other soft material and so located as to clear the ribs 37. The arrangement is such that the line 22 is passed through the tube 30 and thence through the groove 35, as it passes lengthwise of the fitting 34, to the line guide member 21 adjacent to the thumb fitting. The finger member is held by the spring 41 in a position clear of the line so the line may normally have free movement relative thereto. When it is desired to lock the line or to grip it and prevent its advance or retraction, the member 38—45 may be depressed to cause the line to be gripped between the ribs 45 and 37 and held firmly against movement. This locking operation can be performed by the thumb of the hand which grasps the handle 23.

Figure 7:
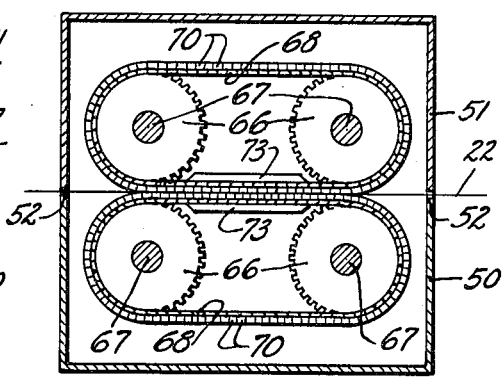
Fig. 7 is a sectional view of the reel in closed position taken in the plane designated by line 7—7 of Fig. 4, and rotated 90 degrees counterclockwise from the position of Fig. 4.
Figure 4:
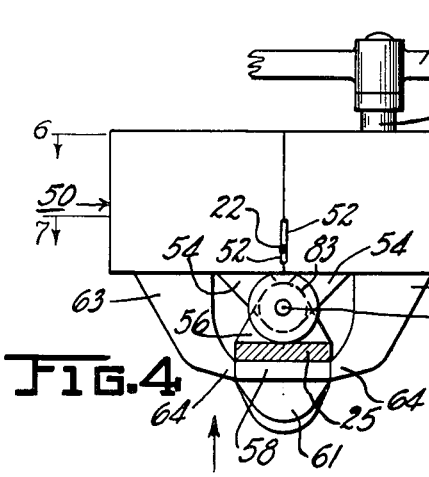
Fig. 4 is an end view of the fishing reel unit in closed position.
Figure 5:
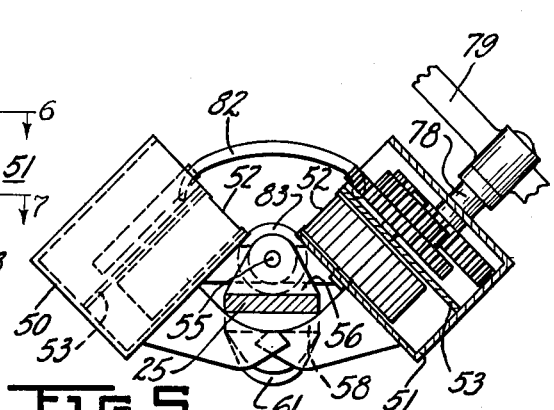
Fig. 5 is an end view of the fishing reel in open position, with parts thereof shown in section.

The reel unit 26 is best shown in Figs. 4 to 8 and its mounting is best seen in Figs. 1, 4 and 5. The reel is housed in a two-part housing or carrier 50, 51. Each housing part has top, bottom and end walls and side walls, and is open at its inner margin. Thus when the parts are arranged in operative position as shown in Figs. 4, 6 and 7, the cavities of the housing parts 50, 51 will be in communication with each other at the substantially horizontal parting plane therebetween, and the housing will otherwise be closed. Line passages are formed at the opposite ends of the housing by notches 52 which preferably are elongated in the parting plane of the housing, as best seen in Fig. 4. The housing will preferably be divided into two compartments by a central partition 53, as best seen in Fig. 5. Each of the housing parts 50 and 51 has a pair of projections 54 depending therefrom and journaled upon a pin 55 mounted by spaced bracket members 56 secured in longitudinally spaced relation upon the reel base plate 25. The arrangement of the parts is such that they may swing between the closed position illustrated in Fig. 4 and an open position as illustrated in Fig. 5. Coil springs 57 may be interposed between the base plate 25 and the inner end of one or both of the parts of the housing to facilitate movement of the housing parts to a selected position, as to the open position illustrated in Fig. 5.

An elongated slide plate 58 has a pair of elongated longitudinal slots 59 formed therein, as illustrated in Fig. 8, to slidably receive the shanks of rivets or pins 60 carried by the reel seat 25, whereby the plate 58 may move longitudinally of the reel seat in a guided path. One end of the plate 58 will preferably have an outturned flange portion 61 to accommodate manual manipulation, and the other end of said plate will preferably have its side edges converging inwardly, as seen at 62 in Fig. 8. Each part of the housing has a leg 63 depending therefrom and terminating in a foot portion 64 projecting inwardly therefrom and adapted to engage a side edge of the plate 58 in the relation of the parts shown in Fig. 4 when the housing parts 50, 51 are held in their closed position. Retraction of the plate 58 toward the left, as viewed in Fig. 8, so that it clears the foot members 64, 64, will permit those members to swing inwardly toward the Fig. 5 position for the purpose of separation of the housing parts.

Figure 10:
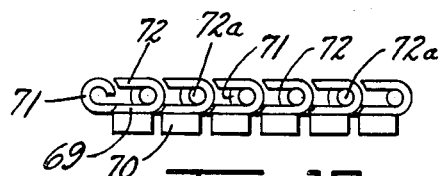
Fig. 10 is a side view of a chain or endless member employed in the device.
Figure 11:
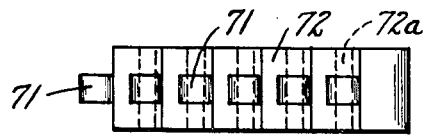
Fig. 11 is a face view of the chain or endless member employed in the device.

Each of the housing parts in one compartment thereof, here illustrated as the inner compartment, has a pair of sprockets 66 mounted on shafts 67 journaled in the housing parts, the shafts 67 preferably extending through both compartments of the housing, that is, through the two compartments on opposite sides of the center partitions 53 of the housing. A chain or link belt 68 is trained around the pair of sprockets 66 in each housing part. This chain may take any form found suitable, and one form found particularly well suited for this purpose is illustrated in Figs. 10 and 11, wherein each link has a flat plate portion 69, to which a rubber pad 70 is adhered or secured. The plate portion 69 of each link has a reduced width longitudinally projecting eye 71 at one end thereof and a pair of laterally spaced return bent arms 72 at its other end located at opposite sides of a notch which receives the eye 71 of an adjacent link. Pins 72a interconnect the adjacent links at the eyes formed by the parts 71, 72 which interfit, as best seen in Fig. 11. These endless members are so located and arranged that when the parts 50 and 51 of the casing are juxtaposed or closed as illustrated in Fig. 7, the rubber or resilient facing pads 70 of the adjacent runs of adjacent endless conveyors will extend in face engagement. For this purpose elongated straight guide or backing members 73 may be carried by each of the housing parts between the adjacent sprockets to cause the line-engaging runs to maintain a positive position in contact with each other and prevent bending or bowing thereof.

The portions of the shafts 67 which extend into the chamber of the housing opposite the chamber which receives the endless chain 68, 70, are suitably journaled in the housing. One of the shafts 67 of each set has a gear 75 thereon of such size and so located as to mesh with a corresponding gear upon the adjacent shaft of the other set. The shaft 67 mounting the gear 75 in the housing part 51 also mounts a pinion 76 which meshes with a gear 77 carried by a shaft 78 journaled in the housing part 51 and projecting therefrom to mount an operating crank 79. By means of this gear arrangement, when the crank 79 is rotated while the housing is closed, the gear train drives one of the shafts 67 associated with each of the endless members and thus causes operation of those endless members synchronously, simultaneously, and at the same rate of speed. When the housing parts are separated, both the gears and the endless conveyors are exposed at the open inner margin of the housing, as best seen in Fig. 5.

The relation of the parts when the housing members 50 and 51 are locked in their closed position, illustrated in Figs. 4 and 7, is such that the line 22 is gripped through a substantial part thereof between the gripping pads 70 of adjacent runs for purposes of traction. The flexible pads 70 accommodate the line by yielding to fit therearound while the remaining portions of the faces of the pads 70 abut each other. When the housing parts are separated in the position shown in Fig. 5, the grip of the reel upon the line is released and the line is free to move through the handle tube 31 when the thumb lock is in the position illustrated in Fig. 2. A retaining arm 82 is pivoted to the partition 53 within the gear housing spaced from the gears as by pivoting thereof in the section 51 by means of a spring pivot. The arm 82 is bent, as best seen in Fig. 5, and its spring causes it to maintain contact at its free end with the partition 53 of the section 50 as the housing parts are swung to separated position. This arrangement holds the line from complete disengagement with the reel and insures that it will be so positioned as to be gripped between the endless gripping members when the reel is reclosed. Washers 83 may be mounted on the pin 55 at one or more points thereof and may pass through slots in the housing parts adjacent thereto and clear of the endless gripping members 68, 70 when closed. These washers serve as means to prevent the line from working out of the reel in a downward direction as viewed in Fig. 5.

In the operation of the device, assuming that it is desired to cast a lure connected to the line 22, the latch plate 58 is shifted from the position shown in Fig. 1 to a position clear of the foot portions 63, 64, so as to permit the two housing parts 50, 51 to separate, as shown in Fig. 5. This frees the grip of the reel upon the line and, when the rod is swung, the lure may be cast without restraint except as restraint may be applied manually by the thumb grip member 38—45. In the usual manipulation, the thumb grip will be applied during the back stroke of the rod and will be released during the forward stroke of the rod to release the line after the rod has achieved forward momentum and during such time as the lure travels to the desired position. Thereupon the thumb lock is reapplied, and the two parts of the reel are shifted to the Fig. 4 position and there locked by sliding of the locking plate 58 to the position shown in Figs. 1 and 4. Thereupon, when it is desired to retrieve the lure, the chank 79 is operated to move the endless line-gripping members and cause them to propel the line endwise in a retrieving direction for the purpose of feeding the line into the line-receiving spherical container 27.

Figure 9:
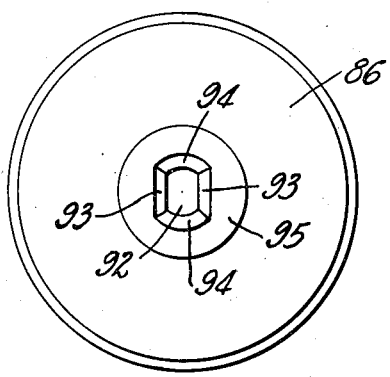
Fig. 9 is a view of the line container as viewed from the exterior at the line-receiving opening thereof.

The construction of the receptacle for the line is best illustrated in Figs. 1 and 9. This receptacle is preferably formed from two parts 86 and 87, each of substantially hemispherical shape and provided with interfitting marginal portions 88 which are detachably secured together as by means of screw threads, a snug fit, or interlock means (not shown). The part 86 is preferably secured to an offset 89 of the reel seat member 25, and a spacer 90 may be employed to properly orient the spherical container 27 relative to the reel base plate 25 and the reel itself. Screws or other securing means 91 may secure the parts together. The hemispherical part 86 preferably has a substantially central opening therein, so oriented as to face and be substantially aligned and centered with the reel. A line guide 92, in the nature of an inwardly tapering tube which preferably has substantially flat side portions 93 in opposed relation and separated by curved portions 94, is mounted in said opening and projects inwardly into the container 27. A flange 95 is suitably secured to the part 86 around the opening. The length of the member 92 is preferably such that it extends a distance approximately one-half the radius of the spherical container 27. This dimension is not critical, however, and the line guide 92 may be much shorter, or in some instances may be longer than that shown. The other part 87 of the container 27 mounts a tapered pin 96 centrally thereof in substantially axial alignment with the tube 92, the same terminating in a rounded tip spaced from the parting plane of the parts 86 and 87. The taper of the pin 96 will be slight and substantially in the order illustrated, although it may be either greater or less than that shown. The end of the line 22, that is, the plastic monofilament line, is received within that receptacle and has a connection therewith. Thus the line may pass through an opening 97, may be knotted at 98, and the knot may be confined by a cap 99.

In operation, assuming that a portion of the line has been played out and the reel is operated to retrieve that portion, the line is forced inwardly into the receptacle in an endwise movement toward the right as viewed in Fig. 1. The line is of selected stiffness such that it follows the internal surface of the spherical container and forms itself into loops in so doing. The function of the pin 96 is to divert the line leading into the container somewhat laterally from center thereof, so that the loops which are formed are not located in the plane of the pin 96 and of the line guide tube 92. Inasmuch as there is endwise resistance due to the frictional engagement of the loops within the container with the walls of the container and with each other, the line is caused to bow into contact with the line guide 92. The line so bowed tends to travel around the tube 92 incident to the operation. If this tube 92 were substantially circular and continuous in its shape, the line would tend to form coils in which the adjacent convolutions abutted each other and in which twist would be introduced into the line as a result. The present construction, wherein parts 93 of the guide tube 92 are substantially flat, causes a diversion of the line in such a manner that adjacent loops thereof are caused to be separated from one another, and, when multiple loops of the line are forced into the container, such multiple loops are so oriented with respect to each other that they form the outline of a sphere by and of themselves. This is of considerable importance in a line of this character because it is necessary that the line, when coiled in the container, shall be free for release incident to a casting operation. Also, it is necessary that this freedom shall be of such a nature that adjacent convolutions of the retained portion of the line will not interlock with each other or cause knots, snarls or kinks in the line which will prevent free playing out of the line incident to a casting operation.

In this connection it will be understood that, while the specific construction shown in Fig. 9, wherein flat surfaces alternate with curved surfaces in the outline of the guide tube 92, are highly satisfactory, this precise shape is not required. Instead, any interruption or deviation of the circumferential shape of the guide tube of such a character as to cause the line to dwell for an instant at certain circumferential points thereof during a line-guiding operation, may serve as well. For instance, the contour of the guide tube could be such that the parts 93, instead of being substantially flat, would be concave or inwardly directed. Still another arrangement would be one in which the surface 93 would be curved outwardly but at a different radius than the curvature of the part 94. Still another possible form would be one in which only one interruption 93 would be provided in an otherwise continuously circular guide tube.

Figure 13:
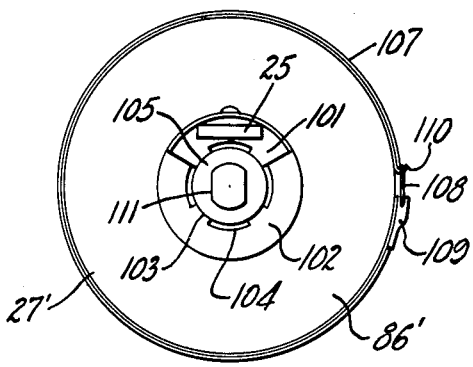
Fig. 13 is a view of the device shown in Fig. 12 as seen in the direction of the arrow in Fig. 12.
Figure 12:
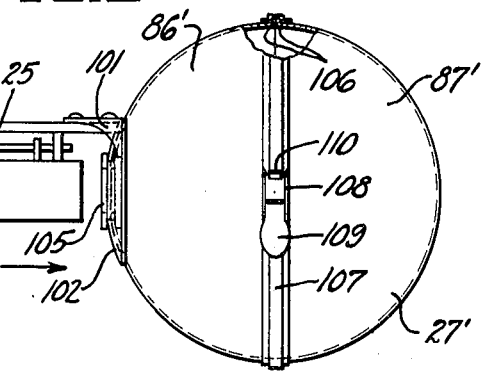
Fig. 12 is a fragmentary view illustrating a modified embodiment of the invention with respect to the means for mounting the line-receiving container thereof.

A modified construction of the line-receiving container and mounting thereof is illustrated in Figs. 12 and 13. In this construction reel base plate 25 has fixedly secured thereto a bracket 101 carrying a circular plate 102 having a central opening 103 interrupted by a plurality of notches 104. The part 86' of the cylindrical container 27' has a ring 105 mounted in an opening thereof, said ring having inwardly projecting spaced teeth adapted to be passed through the notches 104 of the plate 102 and rotated to a position in register with the spaces between the notches 104. The surfaces of the ring and of the plate 102 may be so oriented as to have a helical lead so that the parts 102 and 105 constitute in effect interrupted or broken thread parts which cause the parts to move to locked position as they are rotated through a slight angle after interfitting of the parts.

Another characteristic of the construction illustrated in Figs. 12 and 13 is the provision of each of the parts 86' and 87' with marginal outturned flanges 106 at their open or meeting faces. A band 107 of substantially channel shape in cross-section fits around the flanges 106 to hold the parts 86' and 87' in register to define the sphere 27'. The band may be a split ring having a releasable lock, such as a link 108, carried by a cam member 109 and engageable with a hook portion 110, the cam 109 being pivoted to one end of the band, and the hook 110 being formed at the opposite end of the band, and the parts being drawn together and interlocked when the link 108 is hooked with the part 110. This construction will posses substantially the same advantages as the spherical container 27, and in this connection it will be noted that the ring 105 may have an inner surface provided with flat portions 111 similar to the portions 93 of the line guide as shown in Fig. 9.

Figure 15:
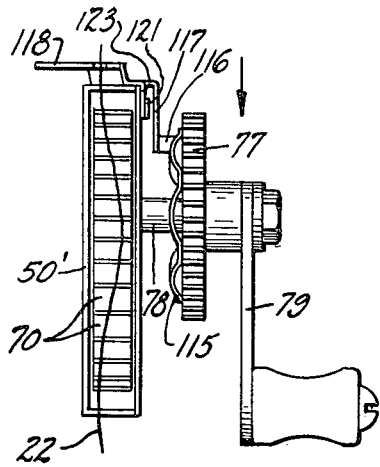
Fig. 15 is a view taken at right angles to Fig. 14 and illustrating the manner in which the line guide finger of Fig. 14 controls the location of the line with reference to the line-retrieving means.
Figure 14:
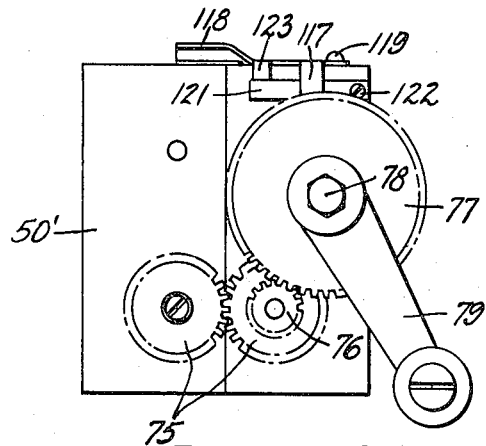
Fig. 14 is a view of a modified embodiment of the reel with a shiftable line guide finger.
Figure 16:
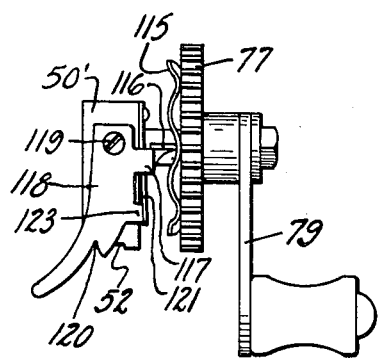
Fig. 16 is a view taken in the direction of the arrow in Fig. 15 to illustrate the line guide finger in elevation.

In view of the fact that movement of the line 22 through the reel in a retrieving direction is endwise of the line, and in view of the fact that any pull exerted upon the line in playing a fish which must be sustained by the reel is in a direction endwise of the line, there may be a tendency, upon the exertion of a pull upon the line, to have the line cut the rubber pads 70 upon the endless line-gripping members. If such tendency becomes objectionable, a structure such as that illustrated in Figs. 14, 15 and 16 may be employed to lay the line in an undulating path between the grips, as by providing an oscillating line guide and cam or like means for oscillating the guide. In the structure shown, the inner face of the gear 77 mounted upon the shaft 78 for rotation by the crank 79 may mount an undulating cam ring 115 adapted to be engaged by a presser foot 116 projecting laterally from an arm 117 extending substantially parallel to the plane of the gear 77 and bent from a guide finger 118 pivoted at 119 to the housing frame, preferably exteriorly thereof as illustrated in Fig. 14, and lying across one end edge of the housing frame so as to intersect the line passage 52 thereof. It will be noted from Fig. 14 that the pin 119 forms an axis for pivotal movement of the finger 118 which is perpendicular to the axis of the shaft 78. The finger 118 will preferably have a notch 120 formed therein confronting the line-receiving passage 52 and adapted to engage a line 22 as it enters the housing. In the construction shown in Figs. 14, 15 and 16, it will be understood that the housing 50' is narrow and confines only the endless line-gripping member and not the gear 77 and the associated gears which are external of the housing 50'. It will be understood, of course, that the gear 77 may be housed within the housing 50, 51 if desired, in which event a proper size relation between the gear 77 and the housing must be provided, that is, a relation of sizes differing from the sizes shown in Figs. 14, 15 and 16. Means may be provided in the structure to insure that the pressure foot 116 remains in contact with the undulating cam 115. Such means are here illustrated as an elongated leaf spring 121 anchored to the frame 50' at 122 and bearing against a projecting arm 123 carried by the plate 118.

In the operation of this embodiment of the invention, the engagement of the presser foot with the cam 115 produces movement of the guide finger 118 about its pivot axis 119 in a direction along the length of the line guide opening 52, so as to traverse that line guide and to move transversely relative to the endless line-gripping means 70. Consequently, the line 22 is caused to assume an undulating shape as it passes between the contacting runs of the endless line-gripping members rather than lying in a straight line. Consequently, as tension is exerted upon the line, tending to straighten it, that pressure will cause the line to take a position different at different instants of application of pull. Furthermore, the pressure is more effectively resisted because there is a greater length of line gripped between the endless gripping members. These two factors in combination serve effectively to resist an action similar to wire-cutting wherein a pull upon the line might tend to groove or bite into the faces of the pads 70 which grip the line.

While the preferred embodiments of the invention have been illustrated and described herein, it will be understood that changes in the construction may be made within the scope of the appended claims without departing from the spirit of the invention.

I claim:

1. A fishing reel comprising a support, a two-part separable carrier having at least one part pivoted to said support and shiftable relative to the other part between open and closed positions, an endless friction member shiftable on each carrier part, said friction members including elongated runs engaging each other in the closed position of said carrier and adapted to grip a line therebetween, and means for advancing said friction members to pass a line endwise therebetween and substantially parallel to the pivot axis between said carrier parts.

2. A fishing reel as defined in claim 1, and a releasable latch for locking said carrier parts in said closed line-gripping position.

3. A fishing reel as defined in claim 1, and spring means urging said carrier parts to open line-releasing position, and a releasable latch for locking said carrier parts in closed line-gripping position.

4. A fishing reel as defined in claim 1, wherein said advancing means include gearing, one gear of each unit meshing with a gear of the other unit when said carrier parts are in closed line-gripping position.

5. A fishing reel as defined in claim 1, and a backing member on each carrier part positioning the line-engaging run of each friction member to provide substantially uniform line-gripping action throughout said run.

6. A fishing reel as defined in claim 1, wherein said endless friction members constitute link belts formed of pivotally connected links engaging drive sprockets, and a rubber face carried by each link and adapted to confront a face of the opposite belt and to engage a line.

7. A fishing unit adapted to be mounted on a reel seat of a fishing rod comprising a substantially spherical line container carried by said reel seat, a two-part separable carrier pivoted to said reel seat adjacent said container said container having an opening confronting said carrier, and said rod, an endless friction member shiftably carried by each carrier part, said friction members having elongated runs substantially parallel to the pivot of said carrier for gripping a line therebetween in one position of said carrier parts, and means for releasably latching said carrier parts in line-gripping position.

8. A fishing unit adapted to be mounted on a reel seat of a fishing rod, comprising a substantially spherical container carried by said reel seat, a two-part separable carrier pivoted to said reel seat adjacent said container, said container having an opening confronting said carrier, an endless friction member shiftably carried by each carrier part, said friction members having elongated runs substantially parallel to the pivot of said carrier for gripping a line therebetween in one position of said carrier parts, and finger-pressure means spaced from said carrier for gripping said line independently of said friction member.

9. A fishing unit adapted to be mounted on a reel seat of a fishing rod, comprising a substantially spherical line container carried by said reel seat, a two-part separable carrier pivoted to said reel seat adjacent to said container and said rod, and an endless friction member shiftably carried by each carrier part, said friction members having elongated runs substantially parallel to the pivot of said carrier for gripping a line therebetween in one position of said carrier parts, said container having an opening aligned with the runs of said friction means and an inwardly projecting pin opposite to and substantially aligned with said opening and said runs for diverting said line within said container.

10. A fishing unit adapted to be mounted on the reel seat of a fishing rod comprising a substantially spherical line container carried by said reel seat, a two-part separable carrier pivoted to said reel seat adjacent so said container, and an endless friction member shiftably carried by each carrier part, said friction members having elongated runs substantially parallel to the pivot of said carrier for gripping a line therebetween in one position of said carrier parts, said container having a non-circular line-receiving opening aligned with the runs of said friction means.

References Cited in the file of this patent

UNITED STATES PATENTS

| | | |
|---|---|---|
| 832,069 | Lindquist | Oct. 2, 1906 |
| 919,042 | Lindquist | Apr. 20, 1909 |
| 1,904,885 | Seeley | Apr. 18, 1933 |
| 2,299,156 | Lind | Oct. 20, 1942 |